(12) United States Patent
Hougen

(10) Patent No.: US 7,702,425 B2
(45) Date of Patent: Apr. 20, 2010

(54) OBJECT CLASSIFICATION SYSTEM FOR A VEHICLE

(75) Inventor: Darrell Hougen, Littleton, CO (US)

(73) Assignee: Ford Global Technologies, Dearborn, MI (US)

( * ) Notice: Subject to any disclaimer, the term of this patent is extended or adjusted under 35 U.S.C. 154(b) by 1579 days.

(21) Appl. No.: 10/862,486

(22) Filed: Jun. 7, 2004

(65) Prior Publication Data
US 2005/0273212 A1    Dec. 8, 2005

(51) Int. Cl.
*B60R 21/34* (2006.01)
(52) U.S. Cl. .......................................... 701/1; 382/103
(58) Field of Classification Search .................... 701/45, 701/1; 382/103, 276, 254, 256, 260; 280/728.1, 280/735, 734
See application file for complete search history.

(56) References Cited

U.S. PATENT DOCUMENTS

| | | | | |
|---|---|---|---|---|
| 5,386,285 A | * | 1/1995 | Asayama | .................... 356/4.01 |
| 5,761,326 A | * | 6/1998 | Brady et al. | ................. 382/103 |
| 5,959,574 A | * | 9/1999 | Poore, Jr. | ...................... 342/96 |
| 6,292,752 B1 | * | 9/2001 | Franke et al. | ................ 701/300 |
| 6,324,453 B1 | * | 11/2001 | Breed et al. | .................... 701/45 |
| 6,487,500 B2 | * | 11/2002 | Lemelson et al. | ........... 701/301 |
| 2004/0234136 A1 | * | 11/2004 | Zhu et al. | .................... 382/224 |

\* cited by examiner

*Primary Examiner*—Dalena Tran
(74) *Attorney, Agent, or Firm*—Angela M Brunetti; Frank MacKenzie

(57) ABSTRACT

A method of classifying objects within a vehicle (12) includes the detection of an object and the generation of an object detection signal in response to the detection. A range signal is generated in response to the object detection signal. An image detection signal is generated having an image representation of the object. The object detection signal is projected on an image plane (122) in response to the image detection signal to generate a fused image reference (120). A search region (144) is generated on the image plane (122) in the vicinity of the fused image reference (120). A vector of feature values is calculated via generation of a sum-array (152) and in response to the range signal and the image detection signal. The search region (144) is classified in response to the vector of feature values.

20 Claims, 3 Drawing Sheets

OBJECT CLASSIFICATION SYSTEM FOR A VEHICLE

TECHNICAL FIELD

The present invention relates to collision warning and countermeasure systems for automotive vehicles. More particularly, the present invention relates to a system and method of classifying detected objects for collision warning and countermeasure performance.

BACKGROUND OF THE INVENTION

Collision warning and countermeasure systems are becoming more widely used. Collision warning systems are able to detect an object within proximity of a host vehicle and assess whether the object detected is an obstacle and poses a threat to the host vehicle. These systems also provide a vehicle operator knowledge and awareness of obstacles or vehicles within close proximity in time such that the operator may perform actions to prevent colliding with the detected obstacles. Countermeasure systems exist in various passive and active forms. Some countermeasure systems are used in the prevention of a collision; other countermeasure systems are used in the prevention of an injury to a vehicle operator.

Collision warning systems may be forward or rearward sensing. These systems can indicate to a vehicle operator that an object, that may not be visible to the vehicle operator, is within a stated distance and location relative to the host vehicle. The vehicle operator may than respond accordingly. Other collision warning systems and countermeasure systems activate passive countermeasures such as air bags, load limiting seat belts, or active vehicle controls including steering control, accelerator control, and brake control whereby the system itself aids in the prevention of a collision or injury.

A detected object of concern may be a real object or a false object. False objects may be detected for example, when there is a stationary roadside object that is foreseen as a true potentially collision-causing object. A false object may also be detected when a small object, that is not a potential threat, is in the path of the host vehicle and is identified and misclassified as a potentially collision-causing object. Another example situation of when a false object may be generated is when a ghost object is generated, which corresponds with an object that actually does not exist.

Also, standard object classification systems tend to detect or generate false objects, due to the highly variable ranges of vehicles and objects. A classification system that utilizes a fixed computing function can generate widely varying and essentially meaningless values for a particular object of interest, due to this variation alone.

The collision warning and countermeasure systems collect data from multiple sensors and associate, fuse, or combine the data to determine whether detected objects are real objects rather than false objects. Advantages of utilizing data from multiple sensors includes extended spatial and temporal coverage, increased accuracy in determining whether an object is a potential threat, and increased reliability in the detection of objects in close proximity of the host vehicle. The stated advantages provide a better assessment of the surroundings of the host vehicle.

There is a current interest in using vision detection sensors, such as cameras, in the detection and classification of objects. Unfortunately, current camera technology requires a large amount of processing power and time to compute relevant information required for in-vehicle use. For example, image processing from a charge coupled device (CCD) camera is time consuming due to the large amount of data collected for each image, approximately 640×480 pixels per frame at 30 frames per second. To accurately classify and track an object can require the acquisition of tens to hundreds of frames of data and each frame having a minimum desired resolution.

A desire exists to provide a safer automotive vehicle with increased collision warning and safety countermeasure intelligence to decrease the probability of a collision or of an injury. It is also desireable for a collision warning and countermeasure system to be time efficient and cost effective. Thus, there exists a need for an improved cost effective collision warning and safety countermeasure system that utilizes time and system resource efficient object detection and classification techniques with improved object classification performance.

SUMMARY OF THE INVENTION

The present invention provides a system and method for classifying objects within close proximity of an automotive vehicle. The method includes the detection of an object and the generation of an object detection signal in response to the detection. A range signal is generated in response to the object detection signal. An image detection signal is generated having an image representation of the object. The object detection signal is projected on an image plane in response to the image detection signal to generate a fused image reference. A search region is generated on the image plane in the vicinity of the fused image reference. A vector of feature values is calculated via generation of a sum-array and in response to the range signal and the image detection signal. The search region is classified in response to the vector of feature values.

The embodiments of the present invention provide several advantages. One such advantage is the provision of a collision warning and countermeasure system that minimizes image processing time, processor requirements, memory requirements, and system complexity, thus providing a cost effective and feasible solution for in-vehicle use of existing camera technology.

Another advantage provided by an embodiment of the present invention is the provision of a method of associating data collected from both electro-magnetic and electro-optical sensors, such as radar sensors and cameras, to better and more efficiently classify and track objects.

Yet another advantage provided by an embodiment of the present invention is the provision of a collision warning and countermeasure system that utilizes registered feature functions and/or feature descriptions to classify an object. The stated embodiment provides increased object classification accuracy and efficiency.

Another advantage provided by an embodiment of the present invention is the provision of a collision warning and countermeasure system that utilizes sum-array techniques to achieve real time performance.

The present invention itself, together with attendant advantages, will be best understood by reference to the following detailed description, when taken in conjunction with the accompanying drawing figures.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
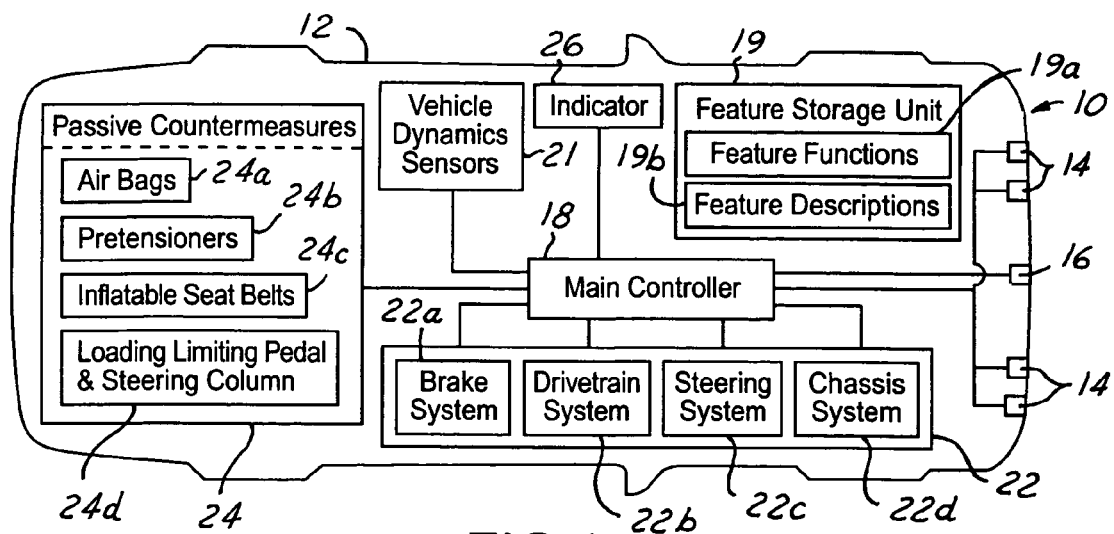
FIG. 1 is a block diagrammatic view of a collision warning and countermeasure system for an automotive vehicle in accordance with an embodiment of the present invention.

In the following Figures the same reference numerals will be used to refer to the same components. While the present invention is described with respect to system and method of classifying detected objects for collision warning and countermeasure performance, the present invention may be adapted and applied to various systems including: collision warning systems, collision avoidance systems, parking aid systems, reversing aid systems, countermeasure systems, vehicle systems, or other systems that may require collision avoidance or assessment.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a passive countermeasure may be operated.

Additionally, in the following description the term "countermeasure" may refer to reversible or irreversible countermeasures. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Referring now to FIG. 1, a block diagrammatic view of a collision warning and countermeasure system 10 for an automotive vehicle or host vehicle 12 in accordance with an embodiment of the present invention is shown. The system 10 includes electro-magnetic or non-vision sensors 14 and one or more electro-optical or image-generating sensors 16 (only one is shown), which are electrically coupled to a main controller 18. The controller 18 combines information received from the electro-magnetic sensors 14 and the electro-optical sensors 16 to detect and associate objects from multiple sensors for the purpose of object tracking and threat assessment within close proximity of the vehicle 12. The system 10 also includes a feature storage unit 19 coupled to the controller 18 and storing multiple validated object templates 20 for the classification of detected objects.

The system 10 may also include various vehicle dynamic sensors 21, active countermeasures 22, passive countermeasures 24, and an indicator 26, which are all electrically coupled to the controller 18. The main controller 18 may activate the countermeasures 22 and 24 or indicate to a vehicle operator various object and vehicle information, via the indicator 26, to prevent a vehicle collision and injury to vehicle occupants.

In determining sensors that are appropriate for a given application, factors such as range, range rate, shape, and size of an object are considered. In an embodiment of the present invention, active sensors in the form of radar are used for non-vision sensors 14 and passive sensors in the form of cameras are used for the image-generating sensors 16 to access surroundings of the vehicle 12. Radar provides derived measurements such as range, range rate, azimuth angle, elevation, and approximate size of an object, as well as other information known in the art. Through the use of cameras measurements, the location, size, and shape of an object, can be derived.

The non-vision sensors 14 may be of various sensor technologies including radar, lidar, or other sensor technology forms known in the art and may be referred to as active sensors. The non-vision sensors 14 generate multiple object detection signals, which may contain radar cross-section (RCS), frequency, and time information, upon detection of one or more objects of various size and shape. Although four non-vision sensors are shown, any number of non-vision sensors may be utilized. In the present invention, the object detection signals are utilized to compute derived measurements such as object relative range, azimuth angle, velocity, and bearing information, as well as other object information known in the art.

The image-generating sensors 16 may be in the form of charge-coupled devices (CCDs), or of another type, such as a camera using complementary metal-oxide semiconductor (CMOS) technology. The image-generating sensors 16 may be referred to as passive sensors. The image-generating sensors 16 are two-dimensional devices that may have varying resolution, accuracy, field-of-view (FOV), and silicon wafer capability. Any number of image-generating sensors 16 may be used.

The main controller 18 may be microprocessor based such as a computer having a central processing unit, memory (RAM and/or ROM), and associated input and output buses. The main controller 18 may be a portion of a central vehicle main control unit, an interactive vehicle dynamics module, a restraints control module, a main safety controller, or may be a stand-alone controller as shown.

The feature storage unit 19 may be in various forms. The feature unit 19 may be in the form of RAM/ROM, a disk drive, a stand-alone memory device, or other storage unit known in the art. The feature storage unit 19 stores registered feature functions 19a and feature definition files 19b for quick access by the controller 18. Any number of feature functions and feature descriptions may be stored in the storage unit 19. The feature functions 19a and feature definition files 19b may be used to determine whether an object of interest satisfies one of the following classification or feature types: an automotive vehicle, a truck, a sport utility vehicle, a trailer, a motorcycle, a pedestrian, a guardrail, a road sign, an inanimate living object, such as a bush or a tree, as well as other objects known in the art. The feature functions 19a and feature definition files 19b may also be used to determine sizes, shapes, colors, and characteristics of an object.

Feature functions 19a are utilized to generate feature values, which are used to classify an object. Feature functions 19a may include a set of registered functions, each having a common set of parameters including a set of "attributed data", an "inner window" specification, and an "outer window" specification. The attributed data includes a set of sum-arrays based on a set of features including intensity data, squared intensity data, x-derivative data, and y-derivative data. A sum-array is defined and described in detail below with respect to steps 108A and 108B of the method of FIG. 9.

The intensity data refers to pixel intensity within a region of interest or within an inner window or an outer window. The squared data is used in essence as a basic textural feature to enhance the contribution from high intensity regions of an image. The use of the squared data eases the calculation of normalized feature values. Normalized feature values are calculated by dividing un-normalized values by the square-root of the sum of the squared values calculated over the same region in which the feature is defined. For example, a normalized feature value $FV_n$ having associated values A and B, can be represented by equation 1.

$$FV_n = \frac{A+B}{\sqrt{A^2+B^2}} \quad (1)$$

A sum-array may be generated and used to represent the squared values, which eases and decreases the amount of time in the calculation of the denominator of such normalized feature values. Feature values may refer to the sizes, shapes, colors, and edge characteristics of an object, as well as other feature values known in the art. Multiple feature values can be associated with a particular feature type.

The x-derivative data is used to highlight vertical edge features while the y-derivative data is used to highlight horizontal edge features. Since motor vehicles exhibit strong horizontal and vertical edge features, these data are intended to highlight and aid in the quick identification and classification of vehicles or objects having similar edge functions.

Figure 2:
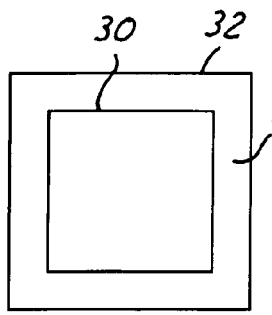
FIG. 2 is a window representation used over an object by a double window probe score function in accordance with an embodiment of the present invention.

The inner and outer window specifications are used as reference points for the determination of the image regions. In one embodiment of the present invention, the sizes of the inner windows are determined for each feature type. The inner window sizes are scaled by the range of the object of interest, which may be determined using information received from the object detection sensors 14. Outer window sizes are determined by adding a margin or band to the inner windows. An inner window 30 and an outer window 32 are shown in FIG. 2. The outer window 32 refers to pixels within the band 34 and not within the inner window 30. The margin may be sized in relation to the inner window 30, such that it is independent of the range of an object of interest. The same inner and outer window specifications may be used for each feature type, but the dimensions of the windows 30 and 32 may be altered to correspond with each feature type. This aids in the simplification of software code by preventing the use of features that have little interest or are irrelevant for a particular vehicle type. For example, a feature having two windows corresponding to headlight positions at the edges of a vehicle is not particularly relevant to a motorcycle class.

Various sets of feature functions may be used for object classification. The following is a list of some sample possible feature functions that may be used: DoubleWindowProbeScore, SquaredDWScore, VerticalEdgeDWScore, HorizontalPosEdgeDWScore, HorizontalNegEdgeDWScore, Averagescore, VerticalEdgeScore, HorizontalEdgeScore, MiddleAverageScore, MiddleHPosEdgeScore, MiddleHNegEdgeScore, MiddleVEdgeScore, DoubleLobeScore, SquaredDLScore, HPosEdgeDLScore, HNegEdgeDLScore, VEdgeDLScore, GroundRatioScore, ShadowScore, BumperScore, LicensePlateScore, LeftHeadLightScore, and RightHeadLightScore. Of course, other feature functions known in the art may be used in addition to or in replacement of the functions listed.

The DoubleWindowProbeScore refers to a function that is used to calculate a double window score. The double window score includes a search for a maximum contrast between an inner window and an outer window, such as between windows 30 and 32. Average pixel intensities may be compared between the windows 30 and 32. The search may be performed in relation to a particular location of an object within the windows.

The SquaredDWScore refers to a function that is used to incorporate squared data in the calculation of the double window score. The VerticalEdgeDWScore refers to a function that is used to incorporate vertical edge data in the calculation of the double window score. The HorizontalPosEdgeDWScore refers to a function that is used to incorporate positive horizontal edge data in the calculation of the double window score. A positive horizontal edge is one in which the pixel intensity, across an image, transitions from dark to light vertically in the image. The HorizontalNegEdgeDWScore refers to a function that is used to incorporate negative horizontal edge data in the calculation of the double window score. The HorizontalNegEdgeDWScore is the inverse of the HorizontalPosEdgeDWScore.

An additional assortment of feature scores may be used when determining the double window score including a "sky penalty score", a "ground penalty score", a "shadow bonus score", a "middle bonus score", and an "edge score". Each feature score is designed to refine the response of the double window function based on certain observed phenomenology.

Figure 3:
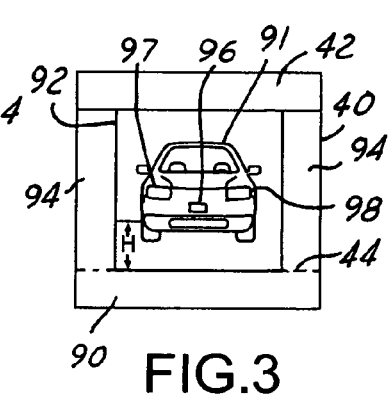
FIG. 3 is a window representation used over an object by a sky penalty score function in accordance with an embodiment of the present invention.

Referring now to FIG. 3, the sky penalty function is designed to reduce or penalize the tendency of the double window function to favor regions in which an outer window 0.40 includes portions of the sky. The sky penalty function is designed to mitigate the effects of this phenomenon by penalizing results in which the upper portion 0.42 of the outer window 40 is brighter than the sides and lower portion or remainder 44 of the outer window 40.

Figure 4:
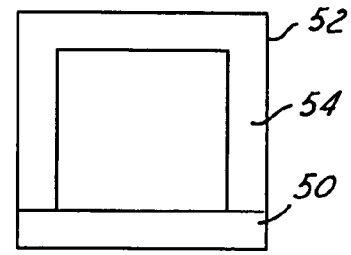
FIG. 4 is a window representation used over an object by a ground penalty score function in accordance with an embodiment of the present invention.

Referring now to FIG. 4, the ground penalty function is similar to the sky penalty function. The ground penalty function is designed to penalize regions in which the lower portion 50 of an outer window 52 is significantly different from the remainder 54 of the outer window 52. The effect of this is to penalize the use of non-ground pixels as ground, to compensate for a bright object.

Figure 5:
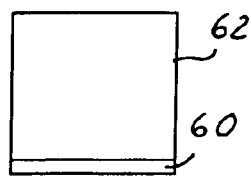
FIG. 5 is a window representation used over an object by a shadow bonus score function in accordance with an embodiment of the present invention.

Referring now to FIG. 5, the shadow bonus function is used to detect the shadow 60 under an object 62. The shadow 60 is a ubiquitous feature of vehicles driving on a road. A shadow can be present during daytime hours, and is especially prominent during clear weather conditions. The shadow bonus score obtained from the shadow bonus function is utilized when it has a positive value, such that inability to detect a shadow does not negatively affect the double window score.

Figure 6:
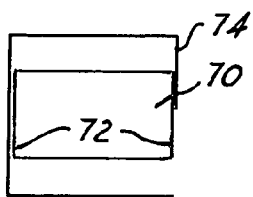
FIG. 6 is a window representation used over an object by a middle bonus score function in accordance with an embodiment of the present invention.

Referring now to FIG. 6, the middle bonus function is used to detect a bright middle region 70. The middle region 70 extends in the horizontal direction to the boundaries 72 of the inner window 74. In the vertical direction, the middle region 70 extends approximately from 25% to 75% of the height of an object. The purpose of this function is to reward the finding of light colored objects or vehicles through positive adjustment of the double window score. The double window function averages the light body of a light colored object with a dark outer window and shadow regions. The result is a region with an average value that is the brightness or equivalent gray scale value as that of a corresponding background or surrounding environment. To counteract this effect the middle bonus function aids in the distinction of light colored objects and in the proper centering of the windows on the object.

Figure 7:
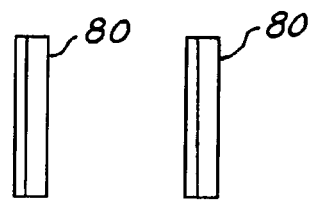
FIG. 7 is a window representation used over an object by a edge score function in accordance with an embodiment of the present invention.

Referring now to FIG. 7, the edge function rewards the detection of vertical edges. Edge information is a strong cue in most vehicle following scenarios. Finding edges, such as edges 80, that are a predetermined distance apart can provide strong evidence for the presence of a vehicle. This function is utilized to increase the double window score when edges are detected, but is not used to decrease the double window score when edges are not detected.

Referring again to FIG. 2, the AverageScore refers to a function that is defined to be the ratio of the pixel intensity to the normalization factor, which is the square-root of the sum of the squared data, within the inner window 30.

Figure 8:
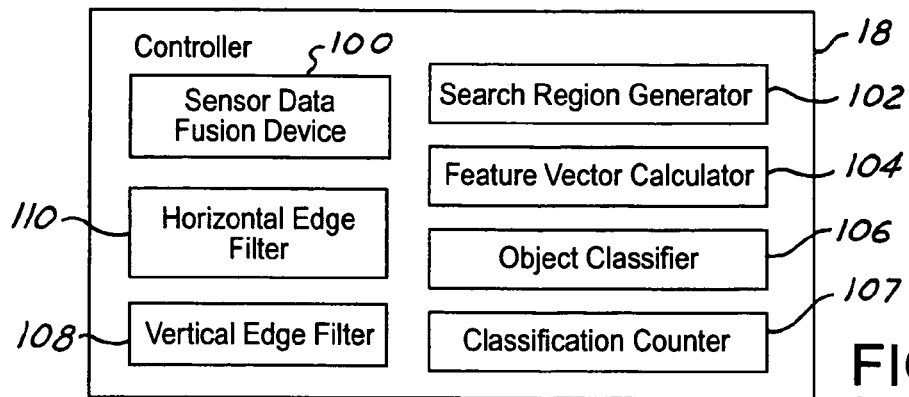
FIG. 8 is a block diagrammatic view of a sample architecture of a controller of the system of FIG. 1 in accordance with an embodiment of the present invention.

The VerticalEdgeScore refers to a function that is the ratio of the average response of a vertical edge filter, such as that shown in FIG. 8, to the normalization factor within the inner window 30. The HorizontalEdgeScore refers to a function that is the ratio of the average response of a horizontal edge filter, such as that shown in FIG. 8, to the normalization factor within the inner window 30.

The MiddleAverageScore refers to a function that is used to compare the pixel intensities of the middle half or band with the upper and lower quarters or bands of an inner window. This function is sensitive to light colored objects. The MiddleHPosEdgeScore refers to a function that is similar to the MiddleAverageScore except that positive horizontal edge data is used instead of the intensity data. The MiddleHNegEdgeScore refers to a function that is similar to the MiddleAverageScore, but negative horizontal edge data is used instead of the intensity data. The MiddleVEdgeScore refers to a function that is used to calculate the ratio of the vertical edges in the middle half of an object with the remaining vertical edges of that object.

Referring again to FIG. 3, the DoubleLobeScore refers to a function that is similar to the DoubleWindowScore, but the top and bottom of the outer window 40, such as the top portion 42 and the bottom portion 90 of the outer windows 40, are not used. The purpose of this function is to isolate the object 91 such that variations in the intensity of the outer window 40, caused by variations in the sky and roadway, do not affect tracking and classification determination of the object 91. The DoubleLobeScore refers to a function that is used to compare the average pixel intensity in the inner window 92 with the average pixel intensity of two lobes 94. The two lobes 94 are vertical bands remaining after removal of the portions 42 and 90.

The SquaredDLScore refers to a function that is used to incorporate squared intensity data in the calculation of the DoubleLobeScore. The HPosEdgeDLScore refers to a function that is used to incorporate positive horizontal edge data in the calculation of the DoubleLobeScore. The HNegEdgeDLScore refers to a function that is used to incorporate negative horizontal edge data in the calculation of the DoubleLobeScore. The VEdgeDLScore refers to a function that is used to incorporate vertical edge data in the calculation of the DoubleLobeScore.

The GroundRatioScore refers to a function that is used to compare the average pixel intensity of the inner window 92 to a window (not shown) that is defined as lying directly below the inner window on a roadway surface. The purpose of this feature function is to compare the brightness of the object to that of the roadway, since the brightness of the roadway has some consistency.

The ShadowScore refers to a function that is used to compare the average pixel intensity of an inner window 92 to a small horizontal slice at the bottom of a horizontal window located approximately in a predetermined shadow location. The BumperScore refers to a function that is used to compare the average pixel intensity of a at approximately a bumper height H of a vehicle with average pixel intensity of pixels not at the bumper height H within the inner window 92.

The LicensePlateScore refers to a function that is used to compare the average pixel intensity within a small rectangular region 96 corresponding with a nominal location of a license plate.

The LeftHeadLightScore refers to a function that is used to compare the average pixel intensity of a small rectangular region 97, located at the nominal location of a left headlight of the object 91, in the inner window 92. The RightHeadLightScore refers to a function that is used to compare the average pixel intensity of a small rectangular region 98, located at the nominal location of a right headlight of the object 91, in the inner window 92.

The feature definition files 19b include feature definitions or features, which may be read during an initiation stage or upon activation of the system and evaluated by a single feature evaluation function. The feature descriptions may be easily edited or modified by a user through a user interface.

Each feature described in the feature definition file is composed of exactly two regions that are compared. Each region may contain one of the attributed data types supported by the system. For example, a feature definition file may describe the comparison of vertical edges in one region to horizontal edges in another region. Each definition file provides the boundary coordinates of each region relative to an origin. The origin may be located at the base of an object, such as on a roadway directly beneath a vehicle and in the horizontal center of the vehicle. Any number of feature definition files may be utilized.

The vehicle dynamics sensors 21 may include a transmission rotation sensor, a wheel speed sensor, an accelerometer, an optical sensor, or other velocity or acceleration sensor known in the art. The vehicle dynamic sensors 21 are used to determine velocity and acceleration of the vehicle 12 and to generate a vehicle dynamics signal.

Active countermeasures 22 may include control of a brake system 22a, a drivetrain system 22b, a steering system 22c, a chassis system 22d, and may include other active countermeasures known in the art.

The passive countermeasures 24 may include passive countermeasures, such as air bags 24a, pretensioners 24b, inflatable seat belts 24c, load limiting pedals and steering columns 24d, and other passive countermeasures and control thereof as known in the art. Some possible passive countermeasures that may be included, but that are not shown are seatbelt control, knee bolster control, head restraint control, load limiting pedal control, load limiting steering control, pretensioner control, external airbag control, and pedestrian protection control. Pretensioner control may include control over pyrotechnic and motorized seatbelt pretensioners. Airbag control may include control over front, side, curtain, hood, dash, or other type of airbag. Pedestrian protection control may include the control of a deployable vehicle hood, a bumper system, or other pedestrian protective device.

Indicator 26 is used to signal or indicate a collision-warning signal or an object identification signal in response to the object detection signals. The indicator 26 may include a video system, an audio system, an LED, a light, a global positioning system, a heads-up display, a headlight, a taillight, a display system, a telematic system, or other indicator. The indicator 26 may supply warning signals, external-warning signals to objects or pedestrians located outside of the vehicle 12, or other pre and post collision-related information.

Referring now to FIG. 8, a block diagrammatic view of a sample architecture of the controller 18 in accordance with an embodiment of the present invention is shown. The controller 18 includes a sensor data fusion device 100, a search region generator 102, a feature vector calculator 104, and an object classifier 106. The fusion device 100 is used for the integration of signals generated by the sensors 14 and 16. The search region generator 102 generates a search region on an image plane in the vicinity of fused image references. The feature vector calculator 104 calculates a vector of feature values. The object classifier 106 classifies each of the search regions in response to the vector of feature values. The controller 18 also includes a classification counter 107, which is used in monitoring the number of instances when an object is consistently classified as a vehicle or other potentially threatening object.

The controller 18 may also include a vertical edge filter 108 and a horizontal edge filter 110. The edge filters 108 and 110 filter data near the edges of an object to provide accurate values thereof. The above-stated devices of the controller 18 and their associated functions are described in further detail below with respect to the embodiments of FIGS. 9 and 10. The above-stated devices of the controller 18 may be in the form of software modules or may be hardware based and/or separated from the controller 18.

Figure 9:
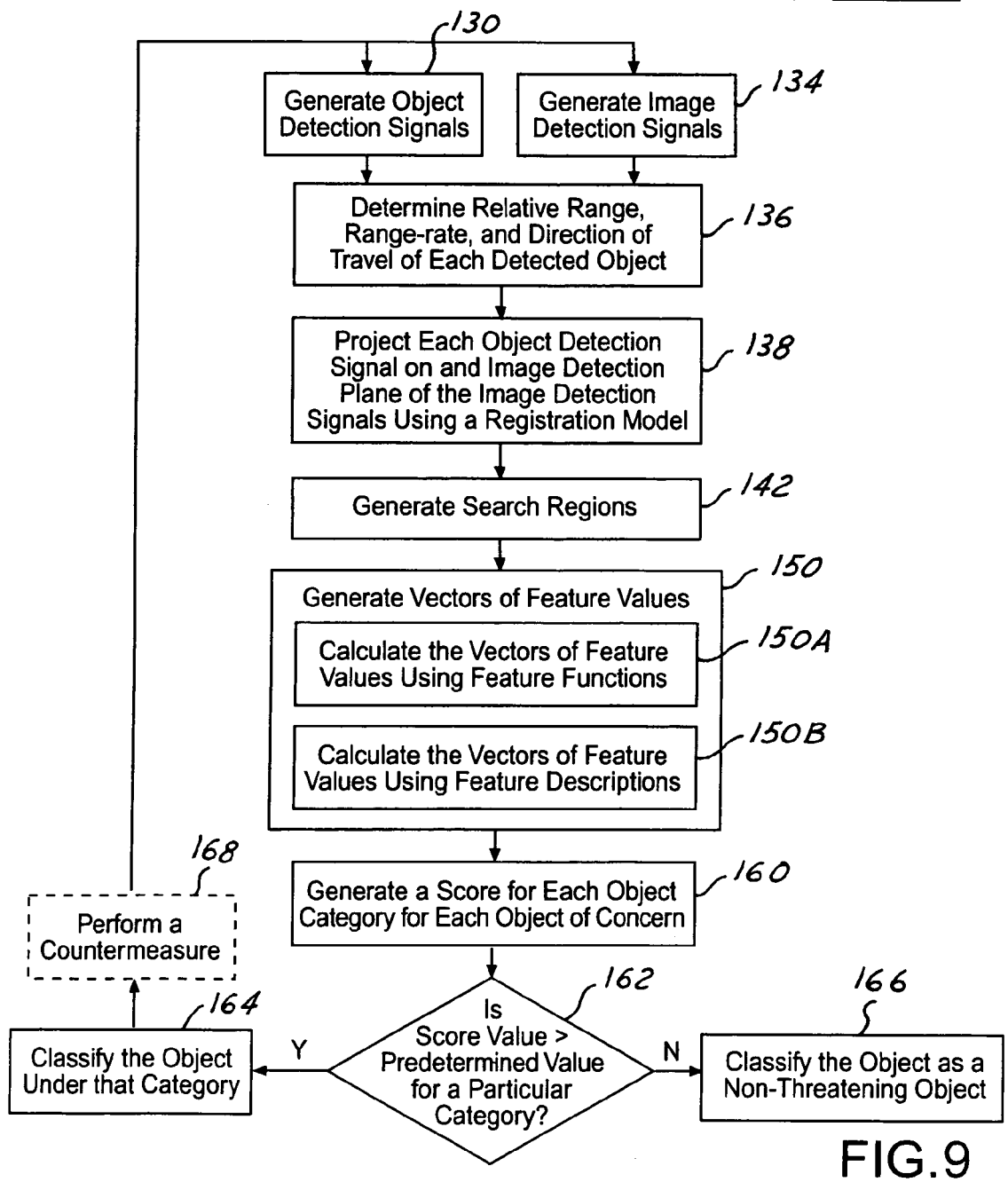
FIG. 9 is a logic flow diagram illustrating a method of performing object classification and collision avoidance in accordance with an embodiment of the present invention.
Figure 10:
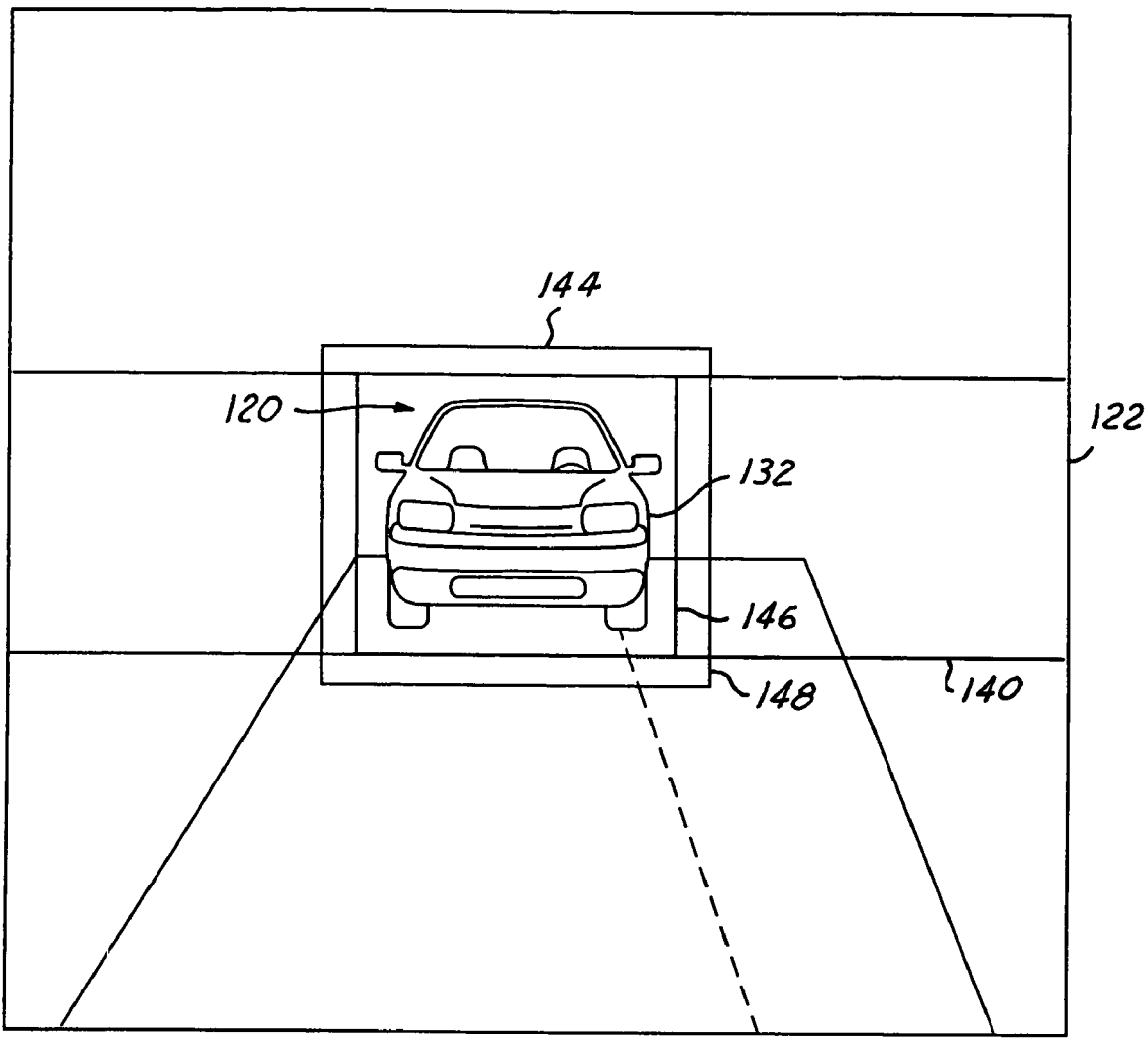
FIG. 10 is a sample of a fused image reference in accordance with an embodiment of the present invention.

Referring now to FIGS. 9 and 10, a logic flow diagram illustrating a method of performing object classification and collision avoidance and a sample fused image reference 120 of an image or image detection plane 122 in accordance with an embodiment of the present invention is shown.

In step 130, the non-vision sensors 14 generate one or more object detection signals in response to detected objects, such as the object 132. The non-vision sensors 14 may perform upramp and downramp sweeps to generate object designators that correspond to the detected objects. The object designators are obtained by comparing a received echo signal with an originally transmitted signal to determine ranges and azimuth angles of the objects. Data received from the non-vision sensors 14 is used to determine initial locations of templates within the image 122 and the locations at which successive matches are attempted. The use of the non-vision sensors 14 significantly reduces the amount of computations performed and provides a source of information that can be used in object verification.

In step 134, the image-generating sensors 16 generate image detection signals. Steps 130 and 134 may be performed simultaneously.

In step 136, range, range rate, and direction of travel are determined for each object of concern relative to the host vehicle 12. The range determined is used to heuristically determine the size of the object 132. The range rate or relative velocity of the object 132 may be determined in response to the Doppler shift between signals, as known in the art.

In step 138, the fusion device 100 projects each object detection signal on an image detection plane, associated with the image detection signals, to generate fused image references, such as the fused image reference 120. This projection is performed using a registration model. The registration model may include relative positions of the sensors 14 and 16 in relation to each other and to ground or a ground plane 140.

In step 142, the search region generator 102 generates search regions, such as the search region 144, on the image plane 122 and in response to the generated fused image references. The search regions define areas of the image that are to be monitored for objects. The locations of the search regions within the image plane are determined in response to the object detection signals. As an example, the search region 144 is shown as having an inner window 146 and an outer window 148. The fused image references may include the reference 120.

In step 150, the feature vector calculator 104 calculates a vector of feature values in response to the range of each object. In step 150A, the feature vector calculator 104 calculates the vector of feature values using feature functions, such as the above-described feature functions. The vector may contain one or more values determined by the feature functions. In step 150B, the feature vector calculator 104 calculates the vector of feature values using the above-described features that are described within the feature definition files 19b. For quick calculation of the feature values, both of the techniques described in steps 150A and 150B may utilize a sum-array technique described below. The vector of feature values may be determined by selectively determining a point or group of points near the center of an object, which are consistent with or resemble that of a vehicle or potentially threatening object.

Figure 11A:
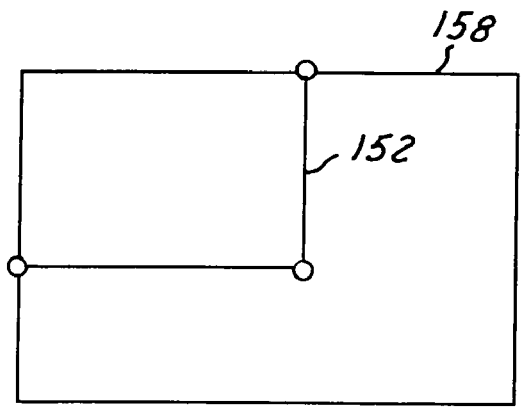
FIG. 11A is a sample graphical diagram of the elements of a sum-array in accordance with an embodiment of the present invention.
Figure 11B:
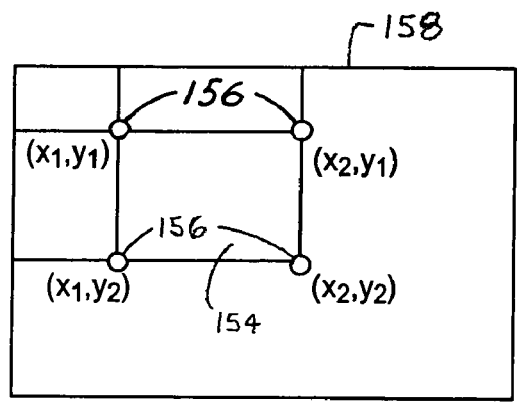
FIG. 11B is a sample graphical diagram of the elements of a sum-array and corresponding sum areas in accordance with an embodiment of the present invention.

Each entry of a sum-array is the sum of the corresponding pixel values above and to the left of the array entry. This is illustrated in FIGS. 11A and 11B by sum-array 152 and array entry 154. Once a sum-array has been generated and, for example, is in rectangular form, the sum of the values in the sum-array can be calculated from the values associated with the four corners of the rectangle. For example, the sum of the values in the sum-array 152 may be calculated from the values of the corners 156. Values $v_{1,1}$, $v_{1,2}$, $v_{2,1}$, and $v_{2,2}$ are the values associated with the upper-left, upper-right, lower-left, and lower-right corners 156, respectively, of a corresponding image region 158 in which the sum is desired. The sum is represented by equation 1.

$$\xi = \sum_{i=y_1}^{y_2} \sum_{j=x_1}^{x_2} I_{i,j} = v_{2,2} - v_{2,1} - v_{1,2} + v_{1,1} \qquad (1)$$

The image is denoted as $I_{i,j}$, where $[x_1,x_2] \times [y_1,y_2]$ is the region for which the sum is desired.

The above method of calculating a sum minimizes computational time. This is especially true when the sum is calculated over a large region. The amount of time required to calculate the sum is independent of the size of the search region, thus the method is more deterministic. As an example, consider calculating the sum in a 50×50 pixel window. The number of array accesses required to calculate a sum by conventional means is 2,500. Using the above sum-array method, the number of array accesses is four, corresponding to the four corners.

In step 160, the object classifier 106 generates a score corresponding to each object category for each object of concern. In so doing, the object classifier 106 may utilize a decision tree and apply the vector of feature values determined in step 150 to the decision tree. The decision tree may compare object attributes with the values of the vector of feature values and generate a score corresponding to each object category. In using a decision tree, operations are recursively performed until a single branch or "leaf" of the tree is reached, thereby signifying the appropriate score value.

In step 162, the object classifier 106 compares the score for each category with predetermined values to determine which category the object of concern has the most similarities therewith. When the score is greater than the predetermined value for a particular category step 164 is performed, otherwise step 166 is performed.

In step 164, the object classifier 106 classifies each search region. The object identifier classifies the object under that category for which the score exceeded. The classification counter 107 increments a classification value for a particular object when the object is consistently classified in the same category. In step 166, the object classifier defaults to a non-object classification value, a false object value, a background value, or some value for which the object is assigned a non-threatening value.

In step 168, upon classification of the objects the controller 18 may then perform one or more of the countermeasures 22 or 24 or warn a vehicle operator via the indicator 26. The countermeasures may be performed when the classification value is greater than a predetermined threshold value.

The above-described steps are meant to be an illustrative example; the steps may be performed sequentially, synchronously, simultaneously, or in a different order depending upon the application.

The present invention provides a collision warning and countermeasure system that utilizes non-vision sensors in conjunction with image-generating sensors to minimize and simplify image processing and more efficiently classify and track objects. The multiple sensor data fusion architecture of the present invention reduces the amount of image processing by processing only selected areas of an image frame as determined in response to information from the sensors. The present invention provides improved object classification through use of vectors of feature values, decision trees, and scoring and consistency checking techniques.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for classifying objects within a vehicle, said method comprising the steps of:
    detecting at least one object using at least one non-vision sensor and generating at least one object detection signal in response to the detection;
    generating at least one range signal in response to said at least one object detection signal;
    generating at least one image detection signal using at least one image generating sensor comprising an image representation of said at least one object;
    projecting said at least one object detection signal on an image plane in response to said at least one image detection signal to generate at least one fused image reference;
    generating at least one search region on said image plane in vicinity of each of said at least one fused image reference;
    calculating at least one vector of feature values via generation of at least one sum-array and in response to said at least one range signal and said at least one image detection signal; and
    classifying each of said at least one search region in response to said at least one vector of feature values;
    wherein said at least one vector of feature values is calculated using a plurality of functions;
    wherein said plurality of functions comprise a common set of parameters selected from at least one of attributed data, inner window specifications, or outer window specifications;
    wherein said attributed data comprises a set of sum-arrays; and
    wherein said set of sum-arrays are formed in response to a set of features selected from at least one of intensity data, squared intensity data, x-derivative data, and y-derivative data.

2. A method for classifying objects within a vehicle, said method comprising the steps of:
    detecting at least one object using at least one non-vision sensor and generating at least one object detection signal in response to the detection;
    generating at least one range signal in response to said at least one object detection signal;
    generating at least one image detection signal using at least one image generating sensor comprising an image representation of said at least one object;
    projecting said at least one object detection signal on an image plane in response to said at least one image detection signal to generate at least one fused image reference;
    generating at least one search region on said image plane in vicinity of each of said at least one fused image reference;
    calculating at least one vector of feature values via generation of at least one sum-array and in response to said at least one range signal and said at least one image detection signal; and
    classifying each of said at least one search region in response to said at least one vector of feature values;
    wherein said at least one vector of feature values is generated in response to at least one feature definition file.

3. A method for classifying objects within a vehicle, said method comprising the steps of:
    detecting at least one object using at least one non-vision sensor and generating at least one object detection signal in response to the detection;
    generating at least one range signal in response to said at least one object detection signal;
    generating at least one image detection signal using at least one image generating sensor comprising an image representation of said at least one object;
    projecting said at least one object detection signal on an image plane in response to said at least one image detection signal to generate at least one fused image reference;
    generating at least one search region on said image plane in vicinity of each of said at least one fused image reference;
    calculating at least one vector of feature values via generation of at least one sum-array and in response to said at least one range signal and said at least one image detection signal; and classifying each of said at least one search region in response to said at least one vector of feature values;

wherein said at least one vector of feature values is generated in response to at least one feature definition file using a single feature evaluation function.

4. A method as in claim 3, wherein the use of said single feature evaluation function comprises the step of comparing two portions of said at least one search region with corresponding values within said at least one feature definition file.

5. A method for classifying objects within a vehicle, said method comprising the steps of:

detecting at least one object using at least one non-vision sensor and generating at least one object detection signal in response to the detection;

generating at least one range signal in response to said at least one object detection signal;

generating at least one image detection signal using at least one image generating sensor comprising an image representation of said at least one object;

projecting said at least one object detection signal on an image plane in response to said at least one image detection signal to generate at least one fused image reference;

generating at least one search region on said image plane in vicinity of each of said at least one fused image reference;

calculating at least one vector of feature values via generation of at least one sum-array and in response to said at least one range signal and said at least one image detection signal;

classifying each of said at least one search region in response to said at least one vector of feature values;

scoring each of said at least one search region to generate at least one classification score; and performing at least one countermeasure in response to said at least one classification score.

6. An object classification system for a vehicle, said system comprising:

at least one non-vision object detection sensor for detecting at least one object and generating at least one object detection signal and at least one range signal in response to the detection;

at least one image-generating sensor for generating at least one image detection signal comprising an image representation of said at least one object;

a fusion device for projecting said at least one object detection signal on an image plane in response to said at least one image detection signal to generate at least one fused image reference;

a search region generator for generating at least one search region on said image plane in vicinity of each of said at least one fused image reference;

a feature vector calculator for calculating at least one vector of feature values via generation of at least one sum-array and in response to said at least one range signal and said at least one image detection signal; and an object classifier for classifying each of said at least one search region in response to said at least one vector of feature values;

wherein said feature vector calculator is operable to generate said at least one vector of feature values in response to at least one feature definition file.

7. An object classification system for a vehicle, said system comprising:

at least one non-vision object detection sensor for detecting at least one object and generating at least one object detection signal and at least one range signal in response to the detection;

at least one image-generating sensor for generating at least one image detection signal comprising an image representation of said at least one object;

a fusion device for projecting said at least one object detection signal on an image plane in response to said at least one image detection signal to generate at least one fused image reference;

a search region generator for generating at least one search region on said image plane in vicinity of each of said at least one fused image reference;

a feature vector calculator for calculating at least one vector of feature values via generation of at least one sum-array and in response to said at least one range signal and said at least one image detection signal; and an object classifier for classifying each of said at least one search region in response to said at least one vector of feature values;

wherein said feature vector calculator is operable to generate said at least one vector of feature values in response to at least one feature definition file using a single feature evaluation function.

8. A method for operating a collision warning and countermeasure system of a vehicle, said method comprising the steps of:

detecting at least one object using at least one non-vision object detection sensor and generating at least one object detection signal in response to the detection;

generating at least one range signal in response to said at least one object detection signal;

generating at least one image detection signal comprising an image representation of said at least one object;

projecting said at least one object detection signal on an image plane in response to said at least one image detection signal to generate at least one fused image reference;

generating at least one search region on said image plane in vicinity of each of said at least one fused image reference;

calculating at least one vector of feature values via generation of at least one sum-array and in response to said at least one range signal and said at least one image detection signal;

classifying each of said at least one search region in response to said at least one vector of feature values;

scoring each of said at least one search region to generate at least one classification score; and performing at least one countermeasure in response to said at least one classification score.

9. A method as in claim 8, said method further comprising the step of incrementing a classification score value upon consistent classification of said at least one object.

10. A method as in claim 8, said method further comprising the step of selectively determining at least one point near a center of said at least one object, which is consistent with a potential threatening object.

11. A method for classifying objects within a vehicle, said method comprising the steps of:

detecting at least one object using at least one non-vision object detection sensor and generating at least one object detection signal in response to the detection;

generating at least one range signal in response to said at least one object detection signal;

generating at least one image detection signal comprising an image representation of said at least one object;

projecting said at least one object detection signal on an image plane in response to said at least one image detection signal to generate at least one fused image reference;

generating at least one search region on said image plane in vicinity of each of said at least one fused image reference;

calculating at least one vector of feature values via generation of at least one sum-array and in response to said at least one range signal and said at least one image detection signal; and classifying each of said at least one search region in response to said at least one vector of feature values.

12. A method as in claim 11, wherein said at least one vector of feature values is calculated using a plurality of functions.

13. A method as in claim 12, wherein said plurality of functions are formed in response to double-window parameters.

14. A method as in claim 13, wherein said double-window parameters comprise at least one parameter selected from pixel intensity values, pixel contrast values between windows, and edge values.

15. A method as in claim 12, wherein said plurality of functions comprise a common set of parameters selected from at least one of attributed data, inner window specifications, or outer window specifications.

16. A method as in claim 15, wherein said attributed data comprises a set of sum-arrays.

17. An object classification system for a vehicle, said system comprising:

at least one non-vision object detection sensor for detecting at least one object and generating at least one object detection signal and at least one range signal in response to the detection;

at least one image-generating sensor for generating at least one image detection signal comprising an image representation of said at least one object;

a fusion device for projecting said at least one object detection signal on an image plane in response to said at least one image detection signal to generate at least one fused image reference;

a search region generator for generating at least one search region on said image plane in vicinity of each of said at least one fused image reference;

a feature vector calculator for calculating at least one vector of feature values via generation of at least one sum-array and in response to said at least one range signal and said at least one image detection signal; and an object classifier for classifying each of said at least one search region in response to said at least one vector of feature values.

18. A system as in claim 17, wherein said feature vector calculator is operable to use a plurality of functions in calculating said at least one vector of feature values.

19. A system as in claim 18, wherein said plurality of functions are formed in response to double-window parameters.

20. A system as in claim 18, wherein said plurality of functions comprise a common set of parameters selected from at least one of attributed data, inner window specifications, or outer window specifications.

* * * * *